United States Patent [19]

Brunelle et al.

[11] Patent Number: 4,644,053

[45] Date of Patent: Feb. 17, 1987

[54] CYCLIC POLYCARBONATE OLIGOMERS AND METHODS FOR THEIR PREPARATION AND USE

[75] Inventors: Daniel J. Brunelle, Scotia; Thomas L. Evans, Clifton Park; Thomas G. Shannon, Schenectady; David A. Williams, Scotia, all of N.Y.

[73] Assignee: General Electric Company, Schenectady, N.Y.

[21] Appl. No.: 704,122

[22] Filed: Feb. 22, 1985

Related U.S. Application Data

[63] Continuation-in-part of Ser. No. 609,407, May 11, 1984, abandoned.

[51] Int. Cl.$^4$ .............................................. C08G 63/62
[52] U.S. Cl. .................................... 528/371; 528/86; 528/370; 528/372
[58] Field of Search ................... 528/371, 372, 370, 86

[56] References Cited

U.S. PATENT DOCUMENTS

| | | | |
|---|---|---|---|
| 3,155,683 | 11/1964 | Moody | 260/340.2 |
| 3,274,214 | 9/1966 | Prochaska | 260/340.2 |
| 3,297,634 | 1/1967 | Oxenrider et al. | 528/371 |
| 3,299,948 | 1/1967 | Weirauch et al. | 528/171 |
| 3,386,954 | 6/1968 | Schnell et al. | 260/47 |
| 3,422,119 | 1/1969 | Prochaska | 260/340.2 |

OTHER PUBLICATIONS

Schnell et al., Makromol. Chem., 57, 1–11, (1962).
C.A., 97, 216892t, 216893u, 216894v.
Chem. Abstracts, 59, 516d, (1963).
English Language Translation of German Patent Disclosure 1229 101.

*Primary Examiner*—Harold D. Anderson
*Attorney, Agent, or Firm*—William H. Pittman; James C. Davis, Jr.; James Magee, Jr.

[57] ABSTRACT

Cyclic polycarbonate (or thiol analog) oligomer mixtures are prepared by the reaction of bishaloformates or their thio analogs or mixtures thereof with dihydroxy or dimercapto compounds, with alkali metal hydroxides and various amines. The oligomer mixtures may be converted to polycarbonates or their thiol analogs by a method which is particularly adaptable to integration with polycarbonate processing operations.

13 Claims, No Drawings

CYCLIC POLYCARBONATE OLIGOMERS AND METHODS FOR THEIR PREPARATION AND USE

This application is a continuation-in-part of copending application Ser. No. 609,407, filed May 11, 1984, now abandoned.

This invention relates to compositions of matter useful in the preparation of high molecular weight resins such as polycarbonates, and to methods for their preparation and use.

Polycarbonates are typically produced by the reaction of bisphenols with phosgene. This reaction is normally conducted interfacially; that is, in a mixed aqueous-organic system which results in recovery of the polycarbonate in the organic phase. Before the polycarbonate can be extruded, molded or otherwise worked, it must be freed of organic solvent and traces of water and by-products. It is then normally obtained as a solid which must be subjected to relatively cumbersome, high-temperature processing techniques.

Another method of preparing polycarbonates is by transesterification with a bisphenol of a carbonate ester such as diphenyl carbonate or a bis-polyfluoroalkyl carbonate. This method is similar to the phosgene method in the necessity for separation from the product of by-products, many of which are relatively volatile, before processing is possible.

The preparation of low molecular weight cyclic aromatic carbonate polymers and their conversion to linear polycarbonates are known. Reference is made, for example, to the following U.S. Pats.:

U.S. Pat. No. 3,155,683,
U.S. Pat. No. 3,386,954,
U.S. Pat. No. 3,274,214,
U.S. Pat. No. 3,422,119.

The cyclic polymers disclosed therein, however, are single compounds having melting points which are generally too high to permit their convenient use as polycarbonate precursors. For example, the cyclic bisphenol A carbonate trimer disclosed in Example 2 of the aforementioned U.S. Pat. No. 3,274,214 melts at 335°–340° C., with polymerization.

According to U.S. Pat. No. 4,299,948, cyclic polycarbonates of high molecular weight (15,000 or above) may be prepared from a bisphenol bischloroformate in the presence of triethylamine as catalyst. However, this cyclic product is a final polymer which cannot conveniently be used as an intermediate for the production of linear polycarbonates because of its high viscosity.

A principal object of the present invention, therefore, is to provide convenient intermediates for the preparation of polycarbonate resins and their thiol analogs.

Another object is to provide intermediates which are easily prepared and have properties which enable them to be used in integrated resin preparation-processing methods.

A further object is to provide a method for preparation of such intermediates.

A further object is to provide novel polycarbonates and thiol analogs thereof, as well as methods for their preparation.

A still further object is to prepare articles comprising very high molecular weight polycarbonates.

A still further object is to provide a method for preparing resins, said method being capable of integration with processing operations thereon.

Other objects will in part be obvious and will in part appear hereinafter.

In one of its embodiments, the present invention is directed to compositions consisting essentially of mixtures of cyclic oligomers having degrees of polymerization from 2 to about 30, the structural units in said oligomers having the formula

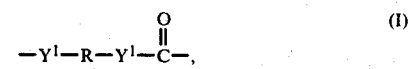

wherein each R is independently a divalent aliphatic, alicyclic or aromatic radical and each $Y^1$ is independently oxygen or sulfur.

Before proceeding with a detailed discussion of the invention, it may be useful to explain some terms used herein. The term "thiol analog", when used with reference to dihydroxy compounds, oligomers and polycarbonates, includes monothio and dithio compounds in which the carbonsulfur bonds are single bonds only. The terms "resin" and "resinous composition" include polycarbonates and polymers containing thiol analogs of the carbonates.

As will be apparent from the above, the cyclic oligomer mixtures of this invention may contain organic carbonate, thiolcarbonate and/or dithiolcarbonate units. The various R values therein may be different but are usually the same, and may be aliphatic, alicyclic, aromatic or mixed; those which are aliphatic or alicyclic generally contain up to about 8 carbon atoms. Suitable R values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all R radicals are hydrocarbon radicals.

Preferably at least about 60% and more preferably at least about 80% of the total number of R values in the cyclic oligomer mixtures, and most desirably all of said R values, are aromatic. The aromatic R radicals preferably have the formula $$-A^1-Y^2-A^2-, \qquad (II)$$

wherein each of $A^1$ and $A^2$ is a single-ring divalent aromatic radical and $Y^2$ is a bridging radical in which one or two atoms separate $A^1$ from $A^2$. The free valence bonds in formula II are usually in the meta or para positions of $A^1$ and $A^2$ in relation to $Y^2$. Such R values may be considered as being derived from bisphenols of the formula $HO-A^1-Y^2-A^2-OH$. Frequent reference to bisphenols will be made hereinafter, but it should be understood that R values derived from suitable compounds other than bisphenols may be employed as appropriate.

In formula II, the $A^1$ and $A^2$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, $Y^2$, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene radical. Also included, however, are unsaturated radicals and radicals which are entirely or partially composed of atoms other than carbon and hydrogen. Examples of such radicals are 2,2-dichloroethylidene, carbonyl, thio and sulfone. For reasons of availability and particular suitability for the purposes of this invention, the preferred radical of formula II is the 2,2-bis(4-phenylene)propane radical, which is derived from bisphenol A and in which $Y^2$ is isopropylidene and $A^1$ and $A^2$ are each p-phenylene.

As noted, each $Y^1$ value is independently oxygen or sulfur. Most often, all $Y^1$ values are oxygen and the corresponding compositions are cyclic polycarbonate oligomer mixtures.

The cyclic oligomer mixtures consist essentially of oligomers having degrees of polymerization from 2 to about 30 and preferably to about 20, with a major proportion being up to about 12 and a still larger proportion up to about 15. Since they are mixtures, these compositions have relatively low melting points as compared to single compounds such as the corresponding cyclic trimer. The cyclic oligomer mixtures are generally liquid at temperatures above 300° C. and most often at temperatures above 225° C.

It has been discovered that the cyclic oligomer mixtures of this invention contain very low proportions of linear oligomers. In general, no more than about 10% by weight, and most often no more than about 5%, of such linear oligomers are present. The mixtures also contain low percentages (frequently less than 30% and preferably no higher than about 20%) of polymers (linear or cyclic) having a degree of polymerization greater than about 30. Such polymers are frequently identified hereinafter as "high polymer". These properties, coupled with the relatively low melting points and viscosities of the cyclic oligomer mixtures, contribute to their utility as resin precursors, especially for high molecular weight resins, as described hereinafter.

The cyclic oligomer mixtures of this invention may be prepared by a condensation reaction involving at least one compound selected from the group consisting of bishaloformates and thiol analogs thereof, said compounds having the formula $$R(Y^1COX)_2, \quad (III)$$

wherein R and $Y^1$ are as defined hereinabove and X is chlorine or bromine. The condensation reaction typically takes place interfacially when a solution of said compound in a substantially non-polar organic liquid is contacted with a tertiary amine from a specific class and an aqueous alkali metal hydroxide solution.

Accordingly, another embodiment of the present invention is a method for preparing a composition comprising cyclic polycarbonate or thiol analog oligomers which comprises the steps of:

I. contacting (A) a composition comprising (1) at least one compound having formula III, or a mixture thereof with (2) at least one bis(active hydrogen) compound having the formula $$R(Y^3H)_2, \quad (IV)$$

wherein each $Y^3$ is independently sulfur when the corresponding R is aliphatic or alicyclic and oxygen or sulfur when the corresponding R is aromatic, with (B) at least one oleophilic aliphatic or heterocyclic tertiary amine and (C) an aqueous alkali metal hydroxide solution having a concentration of about 0.1–10M;

said contact being effected under conditions resulting in high dilution of reagent A, or the equivalent thereof, in a substantially non-polar organic liquid which forms a two-phase system with water, and subsequently II. separating the resulting cyclic oligomer mixture from at least a portion of the high polymer and insoluble material present.

Reagent A, as indicated, is a composition comprising compounds of formula III (reagent A-1) and, optionally, compounds of formula IV (reagent A-2). It may also contain other compounds, including oligomers of the formula

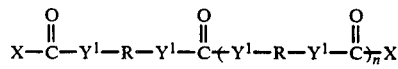

$$X-\overset{O}{\underset{\|}{C}}-Y^1-R-Y^1-\overset{O}{\underset{\|}{C}}(-Y^1-R-Y^1-\overset{O}{\underset{\|}{C}})_{\overline{n}}X$$

wherein R, $Y^1$ and X are as previously defined and n is a small number, typically about 1–4.

While the X values in formula III may be chlorine or bromine, the bischloroformates, in which X is chlorine, are most readily available and their use is therefore preferred. (Frequent reference to bischloroformates will be made hereinafter, but it should be understood that other bishaloformates may be substituted therefor as appropriate.) Suitable bis(active hydrogen) compounds of formula IV (reagent A-2) include diols and thiol analogs thereof having divalent radicals of formula II which are different from the corresponding divalent radicals in the compound of formula III, as well as other dihydroxyaromatic compounds and thiol analogs thereof. When such bis(active hydrogen) compounds are present, they generally comprise up to about 50%, most often up to about 20% and preferably up to about 10%, of reagent A. Most preferably, however, reagent A consists essentially of reagent A-1. Any cyclic oligomers containing divalent aliphatic radicals (or their vinylogs) flanked by two oxygen atoms are prepared by using a mixture of compounds identifiable as reagent A-1.

The bischloroformate may be employed in substantially pure, isolated form. It is frequently preferred, however, to use a crude bischloroformate product. Suitable crude products may be prepared by any known methods for bischloroformate preparation. Typically, at least one bisphenol is reacted with phosgene in the presence of a substantially inert organic liquid, as disclosed in the following United States patents:

U.S. Pat. No. 3,255,230

U.S. Pat. No. 3,966,785
U.S. Pat. No. 3,312,661
U.S. Pat. No. 3,974,126.

The disclosures of these patents are incorporated by reference herein. In addition to the bisphenol bischloroformate, such crude bischloroformate products may contain oligomer bischloroformates containing up to 3 bisphenol units. They may also contain minor amounts of higher oligomer bischloroformates and of monochloroformates corresponding to any of the aforementioned bischloroformates. Higher oligomer mono- and bischloroformates are preferably present, if at all, only in trace amounts.

More preferably, the preparation of the crude bischloroformate product takes place in the presence of aqueous alkali. The pH of the reaction mixture may be up to about 12. It is generally found, however, that the proportion of high polymer in the cyclic oligomer mixture is minimized by employing a crude bischloroformate product comprising a major amount of bisphenol bischloroformate and only minor amounts of any oligomer bischloroformates. Such products may be obtained by the method disclosed in copending, commonly assigned application Ser. No. 676,353, filed Nov. 29, 1984, now abandoned, the disclosure of which is also incorporated by reference herein. In that method, phosgene is passed into a mixture of a substantially inert organic liquid and a bisphenol, said mixture being maintained at a temperature within the range of about 10°–40° C., the phosgene flow rate being at least 0.15 equivalent per equivalent of bisphenol per minute when the temperature is above 30° C. An aqueous alkali metal or alkaline earth metal base solution is simultaneously introduced as necessary to maintain the pH in the range of 0-8. By this method, it is possible to prepare bischloroformate in high yield while using a relatively small proportion of phosgene, typically up to about 1.1 equivalent per equivalent of bisphenol.

When one of these methods is employed, it is obvious that the crude bischloroformate product will ordinarily be obtained as a solution in a substantially non-polar organic liquid such as those disclosed hereinafter. Depending on the method of preparation, it may be desirable to wash said solution with a dilute aqueous acidic solution to remove traces of base used in preparation.

The tertiary amines useful as reagent B ("tertiary" in this context denoting the absence of N—H bonds) generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in the aforementioned U.S. Pat. No. 4,217,438 and in U.S. Pat. No. 4,368,315, the disclosure of which is also incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and reagent A is essential for the formation of the cyclic oligomer mixture. For the most part, such amines contain at least about 6 and preferably about 6–14 carbon atoms.

The amines most useful as reagent B are trialkylamines containing no branching on the carbon atoms in the 1- and 2- positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Reagent C is an aqueous alkali metal hydroxide solution. It is most often lithium, sodium or potassium hydroxide, with sodium hydroxide being preferred because of its availability and relatively low cost. The concentration of said solution is about 0.2–10M and preferably no higher than about 3M.

The fourth essential component in the cyclic oligomer preparation method of this invention is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran.

To prepare the cyclic oligomer mixture according to the above-described method, in step I the reagents and components are maintained in contact under conditions wherein reagent A is present in high dilution, or equivalent conditions. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method reagent A or reagents A and B are added gradually to a mixture of the other materials. It is within the scope of this embodiment to incorporate reagent B in the mixture to which reagent A is added, or to add it gradually, either in admixture with reagent A or separately. Continuous or incremental addition of reagent B is frequently preferred, whereupon the cyclic oligomer mixture is obtained in relatively pure form and in high yield.

Although addition of reagent A neat (i.e., without solvents) is within the scope of this embodiment, it is frequently inconvenient because many bischloroformates are solids. Therefore, it is preferably added as a solution in a portion of the organic liquid, especially when it consists essentially of reagent A-1. The proportion of organic liquid used for this purpose is not critical; about 25–75% by weight, and especially about 40–60%, is preferred.

The reaction temperature is generally in the range of about 0°–50° C. It is most often about 0°–40° C. and preferably 20°–40° C.

For maximization of the yield and purity of cyclic oligomers as opposed to high polymer and insoluble and/or intractable by-products, it is preferred to use not more than about 0.7 mole of reagent A (calculated as bisphenol bischloroformate) per liter of organic liquid present in the reaction system, including any liquid used to dissolve reagent A. Preferably, about 0.003–0.6 mole of reagent A is used when it consists entirely of reagent A-1, and no more than about 0.5 mole is used when it is a mixture of reagents A-1 and A-2. It should be noted that this is not a molar concentration in the organic liquid when reagent A is added gradually, since said reagent is consumed as it is added to the reaction system.

The molar proportions of the reagents constitute another important feature for yield and purity maximization. The preferred molar ratio of reagent B to reagent A (calculated as bisphenol bischloroformate) is about 0.1–1.0:1 and most often about 0.2–0.6:1. The preferred molar ratio of reagent C to reagent A is about 1.5–3:1 and most often about 2–3:1.

Step II of the cyclic oligomer preparation method is the separation of the oligomer mixture from at least a portion of the high polymer and insoluble material present. When other reagents are added to reagent C and the preferred conditions and material proportions are otherwise employed, the cyclic oligomer mixture (obtained as a solution in the organic liquid) typically contains less than 30% by weight and frequently less than about 20% of high polymer and insoluble material. When all of the preferred conditions are employed, the product may contain 10% or even less of such material. Depending on the intended use of the cyclic oligomer mixture, the separation step may then be unnecessary.

Therefore, a highly preferred method for preparing the cyclic oligomer mixture comprises the single step of conducting the reaction using as reagent B at least one aliphatic or heterocyclic tertiary amine which, under the reaction conditions, dissolves preferentially in the organic phase of the reaction system, and gradually adding reagents A, B and C simultaneously to a substantially non-polar organic liquid or a mixture of said liquid with water, said liquid or mixture being maintained at a temperature in the range of about 0°–50° C.; the amount of reagent A is used being up to about 0.7 mole for each liter of said organic liquid present in the reaction system, and the molar proportions of reagents A, B and C being approximately as follows:

B:A—0.2–1.0:1
C:A—2–3:1;

and recovering the cyclic oligomers thus formed.

As in the embodiment previously described, amother portion of said liquid may serve as a solvent for reagent A. Addition of each reagent is preferably continuous, but may be incremental for any or all of said reagents.

Among the principal advantages of this preferred embodiment are the non-criticality of the degree of dilution of the reagents and the ability to complete the addition and reaction in a relatively short time, regardless of reaction scale. It ordinarily takes only about 25–30 minutes to complete cyclic oligomer preparation by this method, and the cyclic oligomer yield may be 85–90% or more. The crude product usually also contains only minor amounts of high molecular weight linear polycarbonates as by-products. By contrast, use of a less preferred embodiment may, depending on reaction scale, require an addition period as long as 8–10 hours and the crude product may contain substantial proportions of linear by-products with molecular weights of about 4,000–10,000, which, if not removed, may interfere with subsequent polymerization of the cyclic oligomers by acting as chain transfer agents.

It is believed that the advantageous results obtained by employing the preferred embodiment are a result of the relatively low pH of the reaction mixture, typically about 9–10. When reagent A (and optionally reagent B) is added to reagent C, on the other hand, the initial pH is on the order of 14.

When step II is necessary, the unwanted impurities may be removed in the necessary amounts by conventional operations such as combining the solution with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers normally means merely separating the same from diluent (by known methods such as vacuum evaporation) and, optionally, from high polymer and other impurities. As previously suggested, the degree of sophistication of recovery will depend on such variables as the intended end use of the product.

The distributions of the molecular species in polycarbonate oligomer products obtained by the method of this invention have been proved by reversed phase high pressure liquid-liquid chromatography. The product was first dissolved in a mixture of tetrahydrofuran and water, whereupon high molecular weight polymer separated by precipitation and the proportion thereof in the product was determined. The material remaining in solution was chromatographed using a relatively non-polar packing, whereupon more polar constituents including linear oligomers were eluted first, followed by cyclic oligomers of progressively increasing degrees of polymerization. For each molecular species, two values were determined and used for identification: the retention time (in minutes) and the "254/280 value". The latter is defined as the ratio of the areas under the ultraviolet absorption peaks at 254 and 280 nm. Both of these wavelengths are characteristic of compounds of this type, and the 254/280 values for individual oligomers are uniquely identifiable.

The standards used for assignment of retention time and 254/280 value were separately prepared linear and cyclic polycarbonate oligomers of bisphenol A having degrees of polymerization of 2–5 and 3–6, respectively. The linear dimer was prepared by protecting one bisphenol A hydroxy group with a triethylsilyl moiety by reaction with triethylsilyl chloride, reacting two moles of the protected molecule with one mole of phosgene, and removing the protective moiety under acidic conditions. The linear trimer was prepared by a similar reaction in which bisphenol A bischloroformate was substituted for the phosgene. Reaction of one mole of the dimer and trimer with two moles of the monochloroformate of the protected bisphenol A, followed by removal of the protective moiety, yielded the linear oligomers with degrees of polymerization of 4 and 5, respectively. Each of these linear oligomers was then reacted with bisphenol A bischloroformate at high dilution to produce the cyclic oligomer having the next higher degree of polymerization.

By comparison with said separately prepared compounds, the cyclic bisphenol A polycarbonate oligomer mixtures of the present invention have been shown to contain a substantial proportion of material having degrees of polymerization from 2 to about 12, with about 50–70% thereof being in the range from 2 to 5. It is generally preferred to use said mixtures as prepared, or optionally with separation of high polymer and/or insolubles. It is frequently possible, however, to isolate individual oligomers in substantially pure form by fractional precipitation techniques. For example, cyclic bisphenol A carbonate tetramer may be isolated by the successive steps of precipitating high polymer by precipitation with acetone, removing oligomers of high degree of polymerization by dissolution in a 20% (by volume) solution of acetone in hexane, extracting the residue with a 60% (by volume) solution of acetone in hexane, and refrigerating the extracts to precipitate the tetramer.

Upon extraction and refrigeration a second time, there is obtained cyclic bisphenol A carbonate dimer. The presence of similar dimers in cyclic oligomer mixtures from other bisphenols was shown by chromatographic comparison with known linear oligomers endcapped with diphenyl carbonate. Substantial amounts of cyclic carbonate dimers also appear in mixtures prepared from chloroformates of other bisphenols having meta and/or para configurations. Accordingly, the present invention includes compositions comprising cyclic dimers having the formula

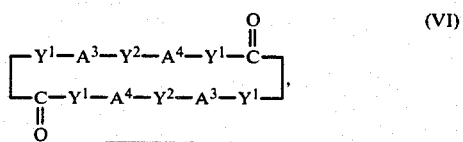

(VI)

time as the bischloroformates; and in Examples 11, 13, 17 and 18, it was added incrementally at the beginning of bischloroformate addition and at intervals of 20% during said addition. The amount of sodium hydroxide used was 2.4 moles per mole of bischloroformate. After all the bischloroformate had been added, the mixture was stirred for about 2 minutes and the reaction was quenched by the addition of a slight excess of 1M aqueous hydrochloric acid. The solution in the organic liquid was washed twice with dilute aqueous hydrochloric acid, dried by filtration through phase separation paper and evaporated under vacuum. The residue was dissolved in tetrahydrofuran and high polymers were precipitated by addition of acetone.

The reaction conditions for Examples 1-18 are listed in Table I together with the approximate percentage (by weight) of cyclic polycarbonate oligomer present in the product before high polymer precipitation. The weight average molecular weights of the cyclic oligomer mixtures were approximately 1300, corresponding to an average degree of polymerization of about 5.1.

TABLE I

| Example | Bischloroformate amt., mmole/l. org. liquid | Bischloroformate amt., total mmol. | NaOH molarity | Molar ratio, amine: bischloroformate | Temperature | Addition time, min. | % oligomer in product |
| --- | --- | --- | --- | --- | --- | --- | --- |
| 1 | 100 | 2 | 0.313 | 0.5 | 20 | 30 | 97 |
| 2 | 100 | 2 | 0.625 | 0.5 | 20 | 30 | 95 |
| 3 | 100 | 2 | 2.5 | 0.5 | 35 | 55 | 93 |
| 4 | 100 | 2 | 2.5 | 0.5 | 0 | 30 | 77 |
| 5 | 100 | 2 | 2.5 | 0.5 | 20 | 30 | 87 |
| 6 | 100 | 2 | 2.5 | 0.5 | 35 | 30 | 78 |
| 7 | 100 | 2 | 2.5 | 0.5 | 50 | 30 | 88 |
| 8 | 100 | 2 | 2.5 | 0.25 | 20 | 30 | 74 |
| 9 | 100 | 1 | 2.5 | 0.2 | 20 | 15 | 75 |
| 10 | 200 | 4 | 2.5 | 0.5 | 20 | 30 | 88 |
| 11 | 500 | 10 | 2.5 | 0.25 | 25 | 105 | 83 |
| 12 | 500 | 10 | 2.5 | 0.25 | 25 | 105 | 78 |
| 13 | 500 | 10 | 2.5 | 0.25 | 25 | 105 | 83 |
| 14 | 500 | 10 | 2.5 | 0.25 | 25 | 105 | 87 |
| 15 | 500 | 10 | 2.5 | 0.29 | 30 | 90 | 78 |
| 16 | 500 | 10 | 2.5 | 0.25 | 30 | 20 | 75 |
| 17 | 500 | 10 | 2.5 | 0.25 | 40-45 | 105 | 79 |
| 18 | 500 | 10 | 2.5 | 0.4 | 25 | 105 | 79 | wherein each of $A^3$ and $A^4$ is a single-ring divalent aromatic radical in which the linkages to oxygen and $Y^2$ are in the meta or para and especially in the para position, and $Y^1$ and $Y^2$ are as previously defined.

The preparation of cyclic oligomer mixtures of this invention is illustrated by the following examples. All parts and percentages in the examples herein are by weight unless otherwise indicated. Temperatures are in degrees Celsius. Molecular weights, whenever referred to herein, are weight average unless otherwise indicated and were determined by gel permeation chromatography relative to polystyrene.

EXAMPLES 1-18

Bisphenol A bischloroformate was reacted with aqueous sodium hydroxide and triethylamine in an organic liquid (chloroform in Example 7, methylene chloride in all other examples) according to the following procedure: The bischloroformate was dissolved in half the amount of organic liquid employed and was added gradually, with slow stirring, to the balance of the reaction mixture. In Examples 1-10 and 12, the triethylamine was all originally present in the reaction vessel; in Examples 14-16, it was added gradually at the same

EXAMPLE 19

Bisphenol A bischloroformate (2.0 mmol.) was reacted with aqueous sodium hydroxide and 4-dimethylaminopyridine in methylene chloride. The procedure employed was that of Example 1, except that 66.67 mmol. of bisphenol A per liter of methylene chloride was employed, the aqueoussodium hydroxide concentration was 5.0M and the reaction temperature was about 25° C. The product comprised 85% cyclic oligomer.

EXAMPLE 20

A solution of 1.4 mmol. of bisphenol A bischloroformate and 0.6 mmol. of 1,4-benzenedimethanol bischloroformate in 10 ml. of a tetrahydrofuran-methylene chloride solution comprising 10% by volume tetrahydrofuran was added over 30 minutes at 30° C., with stirring, to a mixture of 10 ml. of methylene chloride, 2 ml. of 2.5M aqueous sodium hydroxide and 1 mmol. of triethylamine. After addition was complete, the mixture was washed three times with dilute aqueous hydrochloric acid and the organic layer was separated, dried by filtration through phase separation paper and evaporated under vacuum. The product was the desired mixed cyclic polycarbonate oligomer of bisphenol A and benzene-1,4-dimethanol.

EXAMPLES 21-31

Following the procedure of Example 20, products containing at least about 80% mixed cyclic polycarbonate oligomers were prepared from mixtures of bisphenol A bischloroformate and the dihydroxy compounds or dithiols listed in Table II. In each case, a total of 2 mmol. of reagent A was used. The proportion of the listed dihydroxy compound or dithiol was 10 mole percent unless otherwise indicated.

TABLE II

| Example | Dihydroxy compound or dithiol |
| --- | --- |
| 21 | 1,1-Bis(4-hydroxyphenyl)cyclohexane |
| 22 | 1,1-Bis(4-hydroxyphenyl)cyclododecane |
| 23 | 2,2-Bis(4-hydroxy-3,5-dimethylphenyl)propane |
| 24 | 2,2-Bis(4-hydroxy-3,5-dibromophenyl)propane |
| 25 | Bis(4-hydroxyphenyl)sulfone |
| 26 | 4,4'-Thiodiphenol |
| 27 | Bis(4-hydroxy-3,5-dimethylphenyl sulfone |
| 28 | 2,2-Bis(4-hydroxyphenyl)-1,1-dichloroethylene |
| 29 | Hydroquinone |
| 30 | Hydroquinone (15 mole percent) |
| 31 | 4,4'-Biphenyldithiol |
| 32 | 1,12-Dodecanedithiol |

EXAMPLE 33

A solution of 3.10 mmol. of bisphenol A bischloroformate and 0.3 mmol. of bis(2-hydroxyphenyl)methane in 10 ml. of methylene chloride was added over 30 minutes at 25°, with stirring, to a mixture of 10 ml. of methylene chloride, 2 ml. of 2.5M aqueous sodium hydroxide and 0.5 mmol. of triethylamine. After addition was complete, the mixture was worked up as described in Examples 1-18. The product was the desired mixed cyclic polycarbonate oligomer of bisphenol A and bis(2-hydroxyphenyl)methane.

EXAMPLE 34

A mixture of 45.66 grams (200 mmol.) of bisphenol A and 200 ml. of methylene chloride was stirred as gaseous phosgene was passed in for 50 minutes at 0.83 grams per minute (total 420 mmol.). At the same time, 88 ml. of 5M aqueous sodium hydroxide (440 mmol.) was added incrementally to maintain the pH above 10.0. Stirring was continued for 15 minutes, after which the methylene chloride solution of the crude bischloroformate product was separated and washed with 0.1M aqueous hydrochloric acid.

The crude bischloroformate product was added over one hour, with slow stirring, to a mixture of 200 ml. of 5M aqueous sodium hydroxide (1 mole) and 300 ml. of methylene chloride in a Morton flask. There was simultaneously added a solution of 5.05 grams (50 mmol.) of triethylamine in 20 ml. of methylene chloride. Stirring was continued for 15 minutes, after which the mixture was quenched by adding 3M aqueous hydrochloric acid to a pH of 3. The organic layer was washed twice with aqueous hydrochloric acid, dried over magnesium sulfate and vacuum stripped. There was obtained 48.94 grams of a white solid which was shown by high pressure liquid-liquid chromatography to comprise about 80% cyclic polycarbonate oligomers.

EXAMPLE 35

A crude bisphenol A bischloroformate product was employed which was analyzed as follows:

| | |
| --- | --- |
| Monomer bischloroformate | 54% |
| Dimer bischloroformate | 24% |
| Trimer bischloroformate | 12% |
| Tetramer bischloroformate | 7%. |

An amount thereof containing 800 mmol. of principal reagents, calculated as monomer bischloroformate, dissolved in one-half the total amount of methylene chloride used, was added over 37 minutes, with stirring, to a reaction vessel containing 450 ml. of 5M aqueous sodium hydroxide and the balance of the methylene chloride. The total amount of bischloroformate was 400 mmol. per liter of methylene chloride. Triethylamine, 200 mmol., was added incrementally at intervals of 25% during bischloroformate addition. The peak reaction temperature was 39°. Upon workup as in Examples 1-18, there was obtained a product comprising 64% cyclic polycarbonate oligomers.

EXAMPLE 36

A crude bisphenol A bischloroformate product prepared by a method substantially identical to that of Example 35 was analyzed as follows:

| | |
| --- | --- |
| Monomer bischloroformate | 23% |
| Dimer bischloroformate | 19% |
| Trimer bischloroformate | 17% |
| Tetramer, pentamer & hexamer bischloroformates. | 29%. |

Amounts of a methylene chloride solution of said product and aqueous sodium hydroxide solution identical to those used in Example 35 were added over 34 minutes, with stirring, to the remainder of the methylene chloride. Triethylamine, 200 mmol., was added incrementally as in Example 34. The peak reaction temperature was 37°. Upon workup, there was obtained a product comprising 69% cyclic polycarbonate oligomer.

EXAMPLE 37

A crude bisphenol A bischloroformate product prepared by a method similar to that of Example 35, except that the pH was maintained below 8, was analyzed as follows:

| | |
| --- | --- |
| Monomer bischloroformate | 58% |
| Dimer bischloroformate | 26% |
| Trimer bischloroformate | 10%. |

Amounts of a methylene chloride solution of said product and aqueous sodium hydroxide solution identical to those used in Example 35 were added over 37 minutes, with stirring, to the remainder of the methylene chloride. Triethylamine, 200 mmol., was added incrementally as in Example 35. The peak reaction temperature was 40°. Upon workup, there was obtained a product comprising 82% cyclic polycarbonate oligomer.

EXAMPLES 38-40

Bisphenol A bischloroformate, 10 mmol., was added as described in Example 33, over 105 minutes, to a mixture of methylene chloride and 5.6 ml. of 5M aqueous sodium hydroxide solution. Triethylamine, 2.5 mmol., was also introduced in various ways. The reaction mixture was worked up and analyzed as described in Examples 1-18. The results are given in Table III.

TABLE III

| Example | Mode of triethylamine addition | % cyclic oligomers |
|---|---|---|
| 38 | Present in reaction vessel | 72 |
| 39 | Added incrementally at 20% intervals | 79 |
| 40 | Added continuously | 87 |

The cyclic oligomer mixtures of this invention are useful as intermediates for conversion to polycarbonates or their thiol analogs. Accordingly, the present invention includes a method for the preparation of a resinous composition which comprises contacting at least one of the previously defined cyclic oligomer mixtures with a polycarbonate formation catalyst at a temperature up to about 350° C. The oligomer mixtures may frequently be employed in this method without separation of high polymer therefrom, but if desired, high polymer may be removed as previously described.

Previously known methods for forming (e.g., molding) polycarbonates are often cumbersome because of the high viscosities of the polycarbonates. On the other hand, it has not been possible to integrate preparation methods involving the use of phosgene or various monomeric esters with forming operations because of the presence of volatile solvents such as methylene chloride or by-products such as phenol, during or after polymerization. By contrast, the cyclic oligomer mixtures of this invention are liquid and have low viscosities. Moreover, they are substantially non-volatile at resin formation temperatures. Thus, it is possible to integrate resin formation therefrom with such forming operations. For example, the cyclic oligomer mixtures are simultaneously polymerized and molded upon application of heat to the mold. This method, and the molded articles produced thereby, constitute other embodiments of the invention.

The polycarbonate formation catalysts which can be used in the resin formation method of this invention include various bases and Lewis acids. It is known that basic catalysts may be used to prepare polycarbonates by the interfacial method, as well as by transesterification and from cyclic oligomers. Reference is made to the aforementioned U.S. Pat. Nos. 3,155,683, 3,274,214, 4,217,438 and 4,368,315. Such catalysts may also be used to polymerize the cyclic oligomer mixtures. Examples thereof are lithium 2,2,2-trifluoroethoxide, n-butyllithium and tetramethylammonium hydroxide. Also useful are various weakly basic salts such as sodium benzoate and lithium stearate.

Lewis acids useful as polycarbonate formation catalysts include dioctyltin oxide, triethanolaminetitanium isopropoxide, tetra(2-ethylhexyl) titanate and polyvalent metal (especially titanium and aluminum) chelates such as bisisopropoxytitanium bisacetylacetonate (commercially available under the tradename "Tyzor AA") and the bisisopropoxyaluminum salt of ethyl acetoacetate. Among the preferred catalysts are lithium stearate and bisisopropoxytitanium bisacetylacetonate.

The resin formation reaction is typically effected by merely contacting the cyclic oligomer mixture with the catalyst at temperatures up to 350° C., preferably about 200°-300° C., until polymerization has proceeded to the extent desired. Although the use of a solvent is within the scope of the invention, it is generally not preferred. In general, the amount of catalyst used is about 0.001-1.0 mole percent based on oligomer mixture.

Resinous compositions of various structures may be prepared by the use of various cyclic oligomer mixtures. The available options are numerous because the resins obtained from cyclic oligomer mixtures are "living" polymers. Thus, the use of oligomer mixtures prepared from a single material such as bisphenol A chloroformate affords homopolycarbonates. Random copolycarbonates may be obtained by using oligomers prepared from a mixture of reagent A-1 and reagent A-2, or blends of two or more different oligomer mixtures. The preparation of block copolycarbonates may be effected, for example, by reacting a bisphenol A cyclic oligomer mixture with a cyclic oligomer mixture derived from another bisphenol such as 2,2-bis(4-hydroxyphenyl)-1,1-dichloroethylene and controlling the time of addition. If desired, one or both mixtures may be prepolymerized before combining them. Another possibility is the formation of a cyclic oligomer mixture containing about 50 mole percent of (for example) bisphenol A units and about 50% of sterically hindered units which will not condense with themselves, illustrated by 2,2-bis(4-hydroxy-3,5-dimethylphenyl)propane. The resulting cyclic mixtures contain alternating bisphenol A and sterically hindered units, and may be converted to alternating copolycarbonates.

The conditions of the polymerization reaction may be varied to produce resinous compositions of various molecular weights and molecular weight distributions, i.e., Mw/Mn ratios), including resins having properties substantially the same as those of commercial bisphenol A polycarbonates. Molecular weight can be controlled by varying the amount of catalyst, with a decrease in said amount generally resulting in an increase in molecular weight, or by employing known chain transfer or endcapping agents, of which diphenyl carbonate is an example, typically in amounts up to about 2.5 mole percent based on oligomer mixture. It is also possible to produce resins having very low molecular weight distributions (i.e., Mw/Mn ratios), frequently approaching or lower than 2.0.

The resin preparation method of this invention may be used to produce polymers of very high molecular weights, particularly when no endcapping agents are used. Values above 250,000 are readily attainable. Under certain conditions, resins with molecular weights in the 600,000-700,000 range, or even higher, may be prepared. While high molecular weight polycarbonates of this type are known, they have previously been of little use in molding operations because of their intractability under normal molding conditions. This property is irrelevant, however, when the cyclic oligomer mixtures of the present invention are used as polycarbonate precursors since said mixtures can be simultaneously polymerized and molded to produce articles which are very tough and resistant to severe temperature and solvent conditions.

Individual cyclic oligomers (for example, the dimer, trimer or tetramer) may be polymerized by similar procedures. Their use as polymer intermediates is generally not preferred, because their generally high melting points necessitate the use of solvents. However, it has been discovered that the rate of polymerization of the cyclic bisphenol A carbonate dimer of this invention is much higher than those of the corresponding trimer, tetramer or oligomer mixture. For example, under identical conditions of polymerization in 2,4-dichlorotoluene, the dimer was essentially completely polymerized in less than one hour, compared to 2-3 hours for the trimer and tetramer and a substantially more gradual reaction for the oligomer mixture.

The preparation of polycarbonates from the cyclic oligomer mixtures of this invention is illustrated by the following examples.

EXAMPLES 41-46

A crude cyclic bisphenol A polycarbonate oligomer mixture, having a weight average molecular weight of about 1340, prepared by a method similar to that of Examples 1-18 (excluding dissolution in tetrahydrofuran for chromatography purposes) but still containing the high polymer constituents, was heated under nitrogen at 300° C. and a solution of catalyst in methylene chloride was added after about 3 minutes. In Examples 43-45, diphenyl carbonate was added to the oligomer mixture as an endcapping agent. Polymerization was allowed to continue for 10 minutes, after which the polycarbonate was removed, dissolved in methylene chloride, filtered and precipitated by the addition of methanol. The weight average molecular weight, intrinsic viscosity and glass transition temperature (Tg) were also determined. The relevant parameters and results are given in Table IV. Intrinsic viscosities (IV) were determined in chloroform at 25° C.

TABLE IV

| Example | Catalyst Identity | Catalyst Mole % | Diphenyl carbonate mole % | Mw | IV dl/g. | Tg, °C. |
|---|---|---|---|---|---|---|
| 41 | Lithium stearate | 0.1 | — | 300,000* | — | — |
| 42 | "Tyzor AA" | 0.01 | — | 265,000 | — | — |
| 43 | " | 0.002 | — | 269,000 | — | — |
| 44 | " | 0.002 | 1.0 | 117,000 | 0.646 | 157 |
| 45 | " | 0.002 | 1.5 | 141,000 | 0.903 | 152 |
| 46 | " | 0.002 | 2.0 | 65,300 | — | — |

*Minimum value; 300,000 is highest figure determinable on apparatus used.

EXAMPLES 47-52

Various catalysts were thoroughly mixed in a nitrogen atmosphere, with a cyclic bisphenol A polycarbonate oligomer mixture similar to that of Examples 41-46 but having a molecular weight of about 2600. In Examples 47 and 49, the catalysts were added as 0.1M solutions in toluene. The mixtures were heated under nitrogen at 250° C. for three hours, after which the polycarbonates produced were dissolved in methylene chloride, precipitated by pouring into methanol and dried. The relevant parameters and results are given in Table V.

TABLE V

| Example | Catalyst Identity | Mole % | Mw of polymer |
|---|---|---|---|
| 47 | "Tyzor AA" | 0.075 | 194,000 |
| 48 | Lithium 2,2,2-trifluoroethoxide | 0.080 | 37,020 |
| 49 | Bisisopropoxyaluminum salt of ethyl acetoacetate | 0.075 | 175,800 |
| 50 | Sodium benzoate | 0.071 | 258,000 |
| 51 | Dioctyltin oxide | 0.210 | 106,700 |
| 52 | Lithium stearate | 0.099 | 42,890 |

EXAMPLES 53-59

Blends of catalyst and the cyclic bisphenol A polycarbonate oligomer mixture used in Examples 47-52 were prepared. In Examples 53-56, blending was achieved by dissolving oligomers and catalyst in dry methylene chloride, mixing and evaporating the solvent; in Examples 57-59, by thoroughly grinding together solid oligomer and catalyst. A 2-gram sample of each blend was charged to a circular mold having an inside diameter of 1 inch (2.54 cm.), which had been preheated to 250° C. The mold was closed and heated at 250° C. for 3 minutes without applied pressure and for an additional time under a force of 2 tons (1.8 metric tons). It was then opened and the polycarbonate disk was removed. It was homogeneous, tough and could not be broken by bending.

A portion of each disk was dissolved in methylene chloride and weight and number average molecular weights were determined. The results and other relevant parameters are given in Table VI.

TABLE VI

| Example | Identity | Mole % | Total molding time, min. | Mw | Mw/Mn |
|---|---|---|---|---|---|
| 53 | "Tyzor AA" | 0.075 | 30 | 169,000 | 2.7 |
| 54 | " | 0.040 | 30 | 248,700 | 2.2 |
| 55 | " | 0.040 | 15 | 265,400 | 2.05 |
| 56 | Bisisopropoxyaluminum salt of ethyl acetoacetate | 0.075 | 30 | 282,200 | 2.5 |
| 57 | Sodium benzoate | 0.500 | 30 | 222,700 | 12.7 |
| 58 | Dioctyltin oxide | 0.153 | 30 | 118,900 | 20.3 |
| 59 | Lithium stearate | 0.239 | 30 | 60,190 | 2.5 |

EXAMPLES 60-61

Solutions of one gram of the cyclic oligomer mixtures of Examples 22 and 25 and 0.025 mole percent (based on oligomer mixture) of "Tyzor AA" in 20 ml. of o-dichlorobenzene were heated under reflux for 10 hours in a nitrogen atmosphere. The resulting polycarbonates were precipitated by pouring the solution into methanol, dissolved in chloroform and reprecipitated by pouring into acetone. The results are given in Table VII.

TABLE VII

| Example | Cyclic oligomer example | Mw | Mw/Mn | Tg, °C. |
|---|---|---|---|---|
| 60 | 22 | 74,960 | 2.11 | 176 |
| 61 | 25 | 34,230 | 2.11 | 164 |

EXAMPLE 62

A solution of 5 grams of the cyclic oligomer mixture of Example 30 and 0.1 mole percent of "Tyzor AA" is evaporated to dryness under vacuum, and the resulting blend is dried in a vacuum oven at 80° C. for 10 hours. A sample of the blend is heated under nitrogen at 250° C. for 2 hours. The resulting polymer is dissolved in methylene chloride, precipitated by pouring into methanol, redissolved and reprecipitated by pouring into acetone. It has a molecular weight above 250,000.

What is claimed is:

1. A composition consisting essentially of a mixture of cyclic oligomers having varying degrees of polymerization from 2 to about 30, the structural units in said oligomers having the formula

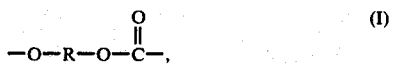  (I)

at least about 60% of the total number of R values in said composition being aromatic and the balance of the R values being aliphatic, alicyclic or aromatic.

2. A composition according to claim 1 which consists essentially of cyclic oligomers having degrees of polymerization up to about 20.

3. A composition according to claim 2 which contains no more than about 10% by weight of linear oligomers.

4. A composition according to claim 3 wherein all of the R values are aromatic.

5. A composition according to claim 2 which contains a substantial proportion of oligomers having degrees of polymerization from 2 to about 12.

6. A composition according to claim 3 which comprises about 50-70% by weight of cyclic oligomers having degrees of polymerization in the range from 2 to 5.

7. A composition according to claim 6 which contains no more than about 5% by weight of linear oligomers.

8. A composition according to claim 4 wherein each R has the formula

  (III)

wherein each of $A^1$ and $A^2$ is a single-ring divalent aromatic radical and $Y^2$ is a bridging radical in which one or two atoms separate $A^1$ from $A^2$.

9. A composition according to claim 8 wherein each of $A^1$ and $A^2$ is p-phenylene and $Y^2$ is isopropylidene.

10. A composition according to claim 9 which contains a substantial proportion of oligomers having degrees of polymerization from 2 to about 12.

11. A composition according to claim 10 which comprises 50-70% by weight of cyclic oligomers having degrees of polymerization in the range from 2 to 5.

12. A composition according to claim 11 which contains no more than about 5% by weight of linear oligomers.

13. A composition according to claim 12 wherein a major proportion of the oligomers have degrees of polymerization up to about 12.

* * * * *